D. CAMERON.
RESILIENT WHEEL.
APPLICATION FILED MAY 28, 1917.

1,252,086.

Patented Jan. 1, 1918.
2 SHEETS—SHEET 1.

Duncan Cameron
Inventor

By Padrick Haughian
Attorney

D. CAMERON.
RESILIENT WHEEL.
APPLICATION FILED MAY 28, 1917.

1,252,086.

Patented Jan. 1, 1918.
2 SHEETS—SHEET 2.

Duncan Cameron
Inventor

By Patrick J. Laughman
Attorney

UNITED STATES PATENT OFFICE.

DUNCAN CAMERON, OF WHITE SULPHUR SPRINGS, MONTANA, ASSIGNOR OF ONE-THIRD TO WM. J. JACKSON AND ONE-THIRD TO JAMES N. CONRO, BOTH OF WHITE SULPHUR SPRINGS, MONTANA.

RESILIENT WHEEL.

1,252,086.      Specification of Letters Patent.      Patented Jan. 1, 1918.

Application filed May 28, 1917. Serial No. 171,558.

*To all whom it may concern:*

Be it known that I, DUNCAN CAMERON, a citizen of the United States, residing at White Sulphur Springs, in the county of Meagher and State of Montana, have invented certain new and useful Improvements in Resilient Wheels, of which the following is a specification.

This invention relates to resilient wheels of that type having curved spring spokes extending between the hub and the felly, and it is the object of the invention to provide a novel and improved wheel of this kind which is simple in construction, and strong and durable, and which has sufficient resiliency to enable the wheel to be successfully used without a pneumatic tire, thus doing away with the trouble, annoyance and expense of such tires.

The invention also has for its object to provide a structure which enables the spokes to be applied to any ordinary automobile wheel after removing the usual wooden spokes, the entire hub assembly, as well as the felly of the wheel, being retained.

The objects stated are attained by means of a novel combination and arrangement of parts to be hereinafter described and claimed, and in order that the same may be better understood, reference is had to the accompanying drawings forming a part of this specification.

In the drawings—

Figure 1:
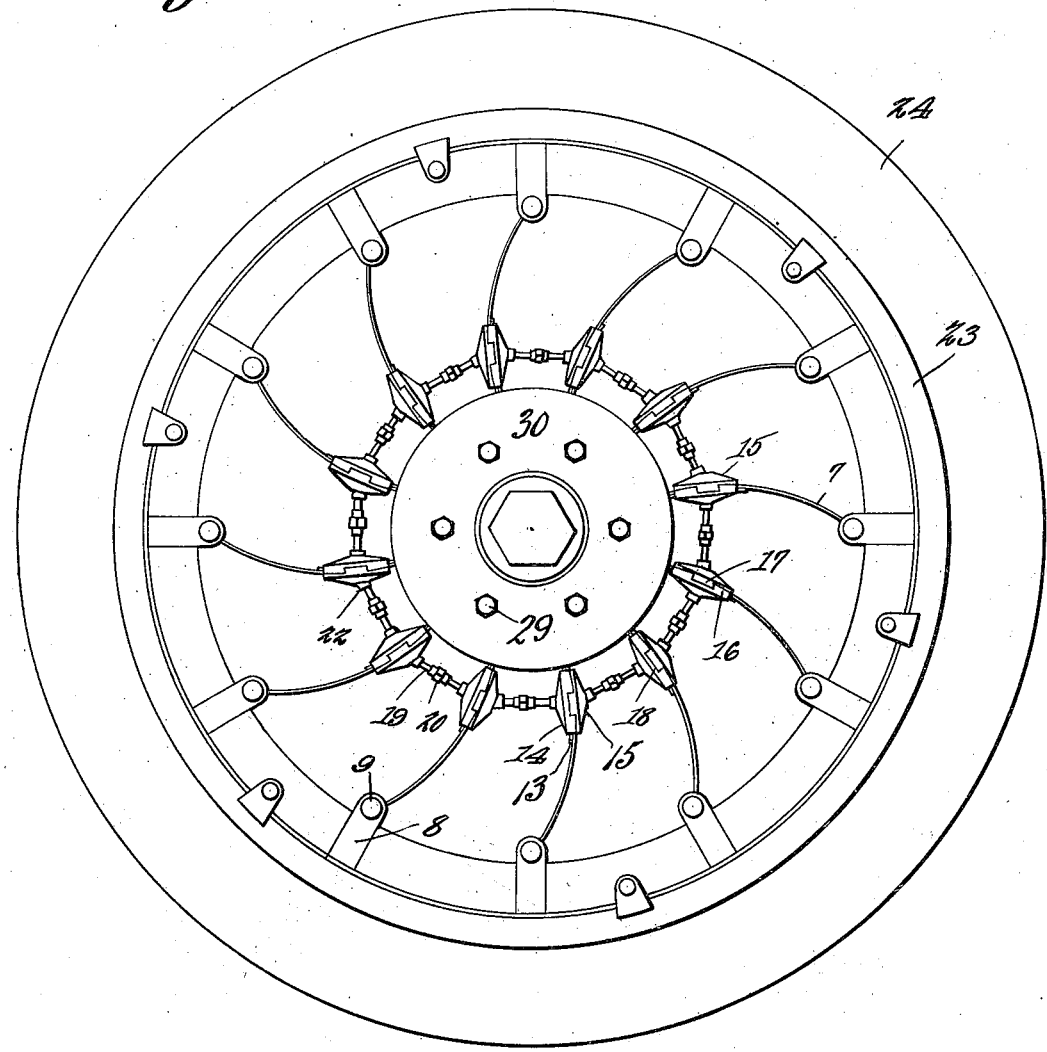
Figure 1 is a side elevation of the wheel.
Figure 2:
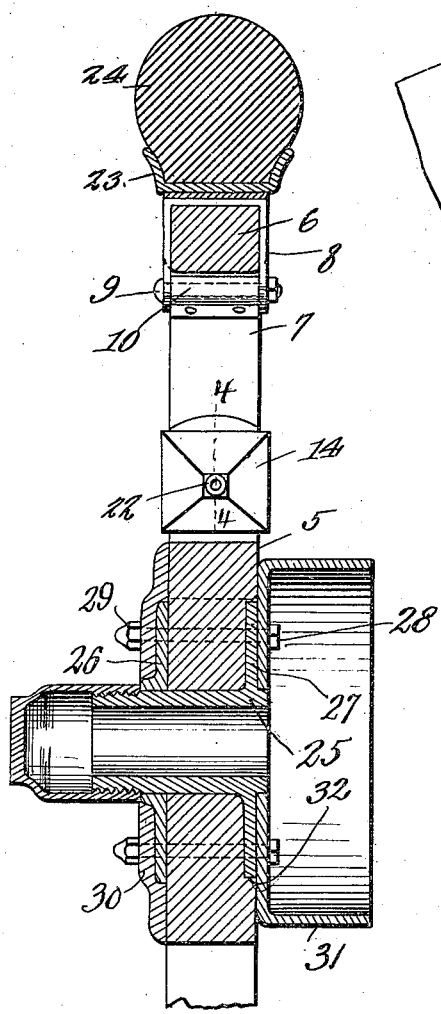
Fig. 2 is an enlarged cross-section of the wheel.
Figure 3:
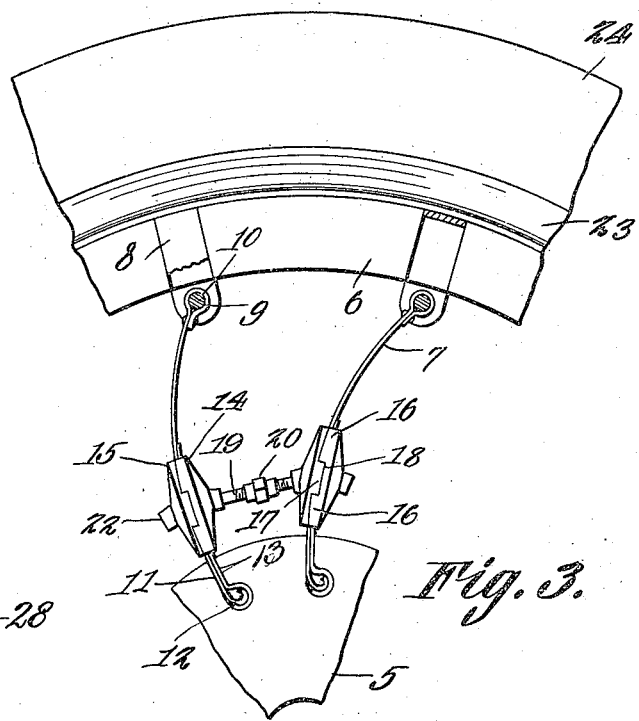
Fig. 3 is an enlarged side elevation of two spokes showing the manner in which they are secured and braced.
Figure 4:
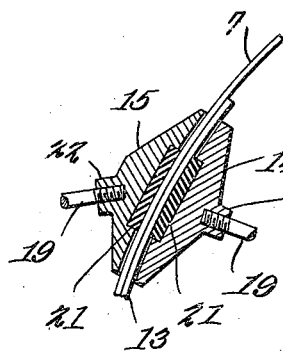
Fig. 4 is a section on the line 4—4 of Fig. 2, the springs being shown in elevation.
Figure 5:
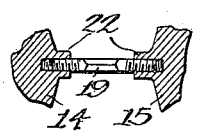
Fig. 5 is a sectional detail showing a slight modification.

Referring specifically to the drawings, the wheel has a hub plate 5, a felly 6, and a series of curved spring spokes 7 extending therebetween, said spokes being flat leaf springs. The outer ends of the spring spokes are connected to the felly by U-shaped clips 8 and bolts 9. The clips straddle the felly and are set flush with the side faces thereof, the inner ends of the branches of the clips projecting inwardly of the felly so that the outer ends of the spokes may seat therebetween and be secured by the bolts passing therethrough. The extremities of the spokes are formed into eyes 10 through which the bolts 9 pass.

The inner ends of the spokes 7 are connected to the hub plate 5, said plate being circular and having radial notches 11 in its periphery in which said ends of the spokes seat. The inner ends of the spokes are also formed with eyes 12 and the inner ends of the notches are correspondingly enlarged to receive the same, whereby outward or radial displacement of the spokes is effectually prevented. The notches open through the sides of the hub plate, and the spokes are inserted and removed edgewise.

In order to strengthen and reinforce the spokes 7, they are provided each with an additional leaf 13 which also seats in the notch and has its inner end curved around the eye 12. This reinforcing leaf does not extend throughout the entire length of the spoke, but terminates some distance from the outer end thereof.

The spokes 7 are provided with a connection applied in such a manner that the strain is distributed throughout the entire series of spokes, and each spoke is flexed more or less when the wheel is in action. This connection comprises the following parts:

On opposite sides of each spoke 7 are fitted plates 14 and 15, respectively. The plate 14 has marginal flanges 16 at its side edge. These flanges face the plate 15 and engage the same, whereby the two plates are spaced from each other sufficiently to permit the spoke to seat therebetween. The plate 15 has marginal side flanges 17 seating in recesses 18 in the flanges 16 whereby the plates are interlocked and held against separation in the direction of the length of the spoke.

Between each plate 14 and the plate 15 of the adjacent spoke extends a brace rod 19, the same being suitably connected to said plates and divided into two sections connected by a turnbuckle 20, so that the rod may be lengthened or shortened. Upon lengthening the rods of the respective sets of plates, said plates are forced together. Lateral displacement of the plates is prevented by the flanges 16 and 17, said flanges engaging the edges of the spokes.

In the inner faces of the plates 14 and 15 are recesses in which seat rubber blocks 21 which engage the sides or faces of the spokes 7 and bind thereagainst when the plates are forced together by the rods 19, whereby the plates are securely held on the spokes. The plates are attached to the reinforced portions of the spokes, and therefore also serve to clamp the leaves 13.

The rods 19 are detachably connected to the plates 14 and 15 so that said plates may be taken off when it becomes necessary to renew any of the spokes. The connection may be made by forming the plates with bosses 22 into which the rods are screwed.

The felly 6 may be equipped with an ordinary demountable rim 23 carrying a tire 24, which latter may be a solid rubber tire, the spring spokes 7 rendering a pneumatic tire unnecessary.

The structure and arrangement of the spring spokes are such that they can be applied to any ordinary automobile wheel. To do this it is necessary only to remove the wooden spokes thereof. The hub 25 is used in its entirety. The plate 5 is placed between the flanges 26 and 27 of the hub, it being made in two sections for this purpose. Bolts 28, secured by nuts 29, fasten the plate to the hub, said bolts passing through the plate and the hub flanges. The diameter of the plate 5 is greater than that of the flange 26, which leaves that portion of the plate exposed in which the notches 11 are located, the flange being inside the circle of notches. In order to close up this exposed portion of the plate 5, there is provided a cap plate 30 fitting the same and covering the notches 11, said cap plate therefore serving as a retainer for the inner ends of the spokes on one side of the wheel. The inner face of the cap plate has a recess in which the flange 26 seats. The cap plate is fastened in place by the bolts 28. The inner face of the plate 5 is covered by the brake drum 31, and the latter therefore serves as a retainer for the spokes on this side of the wheel. As the diameter of the flange 27 is less than that of the plate 5, the latter has its rear face recessed as shown at 32, inside the circle of notches 11, in which recess the flange 27 seats, thereby bringing the back of the brake drum 31 against the notched portion of the plate for the purpose stated.

It will be seen from the foregoing that the structure provides a simple and effective spring wheel, and one which enables an ordinary wheel to be readily converted into a spring wheel without any changes in the structure thereof except to remove the wooden spokes. Repairs can also be readily made, and if a spoke breaks it can be easily removed and replaced, it being necessary only to remove the plate 30 to render the inner ends of the spokes accessible for removal from the plate 5.

Instead of using turnbuckles 20 and sectional rods 19, the rods may be in one piece and provided at their ends with right and left threads to screw into the plates 14 and 15, the intermediate ends of the rods being made flat or squared so that a wrench or other tool may be applied for turning the same.

While the wheel is primarily designed for automobiles, it can be used on any type of vehicle.

I claim:

1. In a wheel, curved resilient spokes extending between the hub and the felly, and longitudinally adjustable braces extending between the spokes intermediate the ends thereof, and connecting the same in a continuous series.

2. In a wheel, curved resilient spokes extending between the hub and the felly, braces extending between the spokes intermediate the ends thereof, and connecting the same in a continuous series, said braces being rods which are in alined sections provided with means for expanding and contracting the same, and anchoring means on the spokes for the rods.

3. In a wheel, curved resilient spokes extending between the hub and the felly, braces extending between the spokes intermediate the ends thereof, and connecting the same in a continuous series, and anchoring means for the braces, said anchoring means comprising opposite plates between which the spoke is positioned and clamped.

4. In a wheel, curved resilient spokes extending between the hub and the felly, braces extending between the spokes intermediate the ends thereof, and connecting the same in a continuous series, and anchoring means for the braces, said anchoring means comprising opposite plates between which the spoke is positioned and clamped, the opposing faces of the plates having interlocked marginal flanges.

5. In a wheel, curved resilient spokes extending between the hub and the felly, braces extending between the spokes intermediate the ends thereof, and connecting the same in a continuous series, anchoring means for the braces, said anchoring means comprising opposite plates between which the spoke is positioned and clamped, and cushion blocks carried by the opposing faces of the plates and engaging opposite sides of the spoke.

6. In a spring wheel, a hub having spaced flanges, a plate separate from the hub and seating thereon between the flanges and having radial notches opening through its periphery, curved spring spokes seating at their inner ends in the notches, cover plates on the sides of the plate over the notched portion thereof, and fasteners passing through the plates and the aforesaid hub flanges.

7. In a wheel, curved resilient spokes extending between the hub and the felly, said spokes being spaced from each other throughout their entire length, and braces extending between the spokes intermediate the ends thereof, and connecting the same in a continuous series.

In testimony whereof I affix my signature.

DUNCAN CAMERON.

Copies of this patent may be obtained for five cents each, by addressing the "Commissioner of Patents, Washington, D. C."